3,298,973
PHENOLIC FOAM COMPOSITIONS
Richard W. Quarles, Princeton, and John A. Baumann, Dunellen, N.J., assignors to Union Carbide Corporation, a corporation of New York
No Drawing. Filed Oct. 10, 1963, Ser. No. 315,397
20 Claims. (Cl. 260—2.5)

This invention relates to the production of improved low density, multicellular foamed structures of thermoset phenol-aldehyde condensates. More particularly, the invention relates to improved phenolic foams having a high resistance to combustion.

Heretofore, it has been known that thermoset phenolic resin foam structures can be prepared from heat-hardenable phenol-aldehyde one-step resins, commonly called "resole" resins. Upon the initiation of the curing reaction of the resole resin, an exothermic reaction of sufficient magnitude occurs to convert the water of condensation and any water initially present to steam. The steam, being fairly uniformly distributed throughout the resin, foams the reacting resin into a frothy mass and, because of the rapid exotherm, the resin converts quickly into an infusible condition before the froth can collapse to any significant extent due to the condensation of steam. The foam produced is often of significantly inferior quality in being open-celled and subject to cavitation caused by "blowholes" or channels formed by the escaping steam. The foam is of non-uniformly textured open-cells and is of higher density and higher porosity than that acceptable to the trade. It is also of low compressive strength and is highly subject to the mechanical abrasion. In fact, it is readily abraded by finger pressure and is not at all resistant to combustion.

While the foaming and curing of the resin can be induced by heat alone, it is conventional to add a catalytic condensation catalyst such as a mineral acid or strong organic acid such as hydrochloric acid, sulfuric acid, toluene sulfonic acid, xylene sulfonic acid, phosphoric acid and the like, or a base such as caustic or KOH or a basic salt such as calcium oxide, sodium sulfite and the like. These latter basic ingredients are generally employed in conjunction with heating. These catalysts serve to initiate the curing exotherm of the resin of such a magnitude as to not only volatilize all the water of condensation or water initially present but also any other volatile ingredient present and thus foam the resin before it becomes set and infusible. Hydrochloric acid and dilute sulfuric acid have been the most commonly employed catalysts for this use, sometimes in conjunction with a base in order to neutralize the acid.

Attempts have been made previously to improve these foams to avoid the disadvantages above mentioned. Blowing agents such as carbon dioxide-liberating compounds such as sodium bicarbonate have been employed to control cell structure. Various volatile organic blowing agents, particularly the volatile liquid agents such as methylene halides, lower aliphatic alcohols and alkyl ethers and similar low boiling organic liquids have been used with some improvement but such foams have limited commercial use. The use of small amounts of aliphatic alcohols, for instance, yields a predominantly coarse cellular structure whereas acetone gives a variable structure of large and small cells, and of high porosity. This again is caused by the open-celled or connecting nature of the cells. The use of low boiling aliphatic ethers improved the foams significantly in producing a more uniform cellular texture of the foams even though open-celled, but the foams are not as resistant to abrasion as is necessary for many applications. However, all such structures when exposed to open flames are easily combustible due to the organic nature of the phenolic resin. Moreover, upon reaching ambient temperatures above about 250° F., the foamed structures are readily subject to combustion.

The combustion of these foams limits their use as thermal insulation since they cannot pass the required flame tests. The "punking" properties of the foam, i.e. the property of continuing to glow and combust without a visible flame, in fact, made them disadvantageous for many commercial uses. The open-celled nature of the foam provides sufficient air flow to sustain combustion internally until the resin is partially or wholly consumed despite the removal of the external heat source.

Conventional additives normally imparting flame retarding characteristics to other resin and even other types of synthetic foams are not readily employed with phenolic resins since they inhibit the curing of the resin. A resin or foam composition which would greatly retard the spreading of combustion throughout the material would be of great interest in many applications where presently available foams cannot be used due to the flammability characteristics as for example in fire rated panel cores, pipe insulation, fire protection for steel construction and insulation for commercial building and homes.

According to the present invention, it has now been found that a mixture of boric acid, or its anhydride, and an organic hydroxy acid will not only catalyze the cure of the phenolic resin and foam the composition but also provides a foamed structure after curing that is resistant to punking and even flame-proofed to a degree sufficient to be non-burning when exposed to a direct flame. When tested by the direct flame testing procedure hereinafter described, these foams even in densities as low as 0.5 pound per cubic foot appear only to char and may carbonize but remain for substantial periods of time as distinct foams without sign of direct combustion.

Normally, phenolic foams undergo combustion in a manner such that normal testing methods are not suitable for distinguishing the non-burning and non-punking foams. A.S.T.M. test methods D–1692 and D–635–44 for example, are not sensitive enough to characterize the non-punking foams. Consequently it has been necessary to devise a test to characterize the foam. This test comprises supporting a one-half inch thick sample of the core foam on a ring stand three inches above a standard Bunsen burner with a constant gas flow to maintain a flame temperature in the range of about 1400° F. A sensitive iron Constantan thermocouple is mounted on the top surface of the foam and the top surface temperature constantly measured and recorded against time. The burner is removed when the top temperature reaches 500° F. On punking foams, combustion continues and the temperature remains at about this temperature or drops very slowly until the foam is consumed and collapses or until the combustion propagates away from the thermocouple sensor. Heat can easily be sensed with the hand near a punking foam, and it cannot be handled.

On a non-punking foam, the surface temperature drops to about 150° F. within about 15–30 seconds and the foam is cool to the touch.

This unusual characteristic appears to be unique only to mixtures of boric acid and these organic hydroxy acids since neither acid alone will not so affect the foam, nor will any other acid or mixture of acids provide such features. Hydrochloric or sulfuric acid catalyzed foams invariably punk under such conditions as do numerous other catalyzed foams as shown in Table II. This table shows those catalysts which, when employed in a phenolic resin, either cure the resin without foaming, or which if they do foam the resin, provide a punking foam or non-punking foam.

Besides being resistant to punking, these catalyzed foams have been found to substantially retard the temperature rise on the top side of the foam specimen and thus be a more effective insulative foam. For example, a standard HCl-catalyzed foam having 4 phr. $B_2O_3$ added and having a core density of 3.5 pounds per cubic foot, completely burned through in only 2.0 minutes by the above described test method; whereas a 5.25 pound per cubic foot foam produced with a mixture of 4 phr. of boric anhydride and 35 phr. oxalic acid, for instance, as a catalyst lasted 52 minutes before the top surface temperature reached 500° F. During this period the top surface temperature was substantially uniform at about 390° F. for over the major portion of this time. Comparison of the time for the surface temperature of the foams to reach 500° F. is illustrated for certain of these foams in Tables III and IV.

This phenomena is quite distinct and different from the time-temperature plot of conventional acid-foamed resins. With such conventional foams, the plot shows an ever increasing temperature after the heating commences to a final exotherm rising to 500° F. With the catalyzed foams of this invention, the surface temperature remains nearly constant for long periods of time until a final exotherm is reached which ultimately is terminated at 500° F. at the end of the test.

The maintenance of fairly uniform surface temperatures on the top of the acid catalyzed foam is not fully understood or easily explained. However, it does appear to be correlated to the reason why such foams are non-punking and non-burning and why conventional foams, which all possess the rapid early exotherm, are punking and burning foams.

Highly satisfactory results are secured with either boric acid or its anhydride, $B_2O_3$, with the latter preferred for ease of handling and since it can be employed in much smaller weight amounts than is the acid per se. However for purposes herein, they will both be referred to as boric acid since the phenolic resins generally contain small amounts of water which will hydrolyze the anhydride to the acid, or on condensation, the water released will form the acid from the anhydride.

The organic hydroxy acids found useful are those acids having a hydroxyl group on a carbon atom no more than one carbon atom removed from the carboxyl group. These are generally characterized as either alpha hydroxy acids for the aliphatic acids or ortho hydroxy acids for the aromatic acids, as is illustrated by such specific acids as oxalic, malic, lactic, glycolic, tartaric, citric, $\alpha$-hydroxybutyric, malonic, salicylic, $\beta$-resorcylic and like acids. Generally the preferred acids have less than 8 carbon atoms, and in the aliphatic acids the more preferred acids have less than 5 carbon atoms. As is evident herein, the hydroxyl group on the vicinal carbon atom or on the next adjacent carbon atom can itself be on a keto carbon atom and thus be a part of a second carboxyl group, as in oxalic acid or malonic acid. These have been found to perform in this invention in the same way as the other hydroxy acids as for example citric and tartaric. In fact oxalic acid is preferred in this invention because of its inexpensiveness and its superior demonstrated effects.

The amounts or respective ratios of the boric acid and hydroxy acids does not appear to be narrowly critical in order to obtain the catalytic effect of curing the resin which initiates the exotherm of sufficient magnitude to foam the resin, and/or volatilize the foaming assist or foaming agent if such is employed. Generally, it is preferred however to have at least 10 parts of acids per hundred parts of resin to quickly initiate the exotherm at room temperatures and cure the resin, and more preferably from 20 to 40 parts of mixed acids per hundred parts of resin. If desired, there may also be added other acidic foaming agents, as hydrochloric or sulfuric acid to increase the foaming rate of the resin, or also if desired amounts of the mixture of acids greater than 40 parts per hundred parts of resin, although little additional benefits are realized in punking on flame resistance of the foamed resin.

The weight or molar ratio of the two acids in the mixture is not narrowly critical. It has been found for instance that as little as two parts of boric acid (or one part of boric anhydride) and two parts of the hydroxy acid each per hundred parts of phenolic resin in the mixture is sufficient to impart non-punking characteristics to these foams. For quick foaming at room temperatures greater amounts of each are preferred, however it is within the concept of this invention to also aid the foaming by heating, as for example foaming and curing in an oven.

It is also within the concept of this invention to use the mixture of these acids in either the solid or liquid form as desired, depending on the speed of foaming and curing desired. For instance, the mixture of these acids dissolved in a mutual solvent therefor, or mixture of liquefied acids will foam the resin composition almost instantaneously whereas powdered mixtures of these acids or anhydrides acts more slowly and provides sufficient time for intimate mixing.

Solid mixtures of these acids also provides additional advantages in being able to catalyze the more reactive resole resins as well as with the more advanced and more fully cured resoles. With the former, it provides for the longer mixing time which was not always possible with the more reactive resins using conventional acid catalysts. With the more advanced and more viscous resole resins, it may be desirable to use a liquid mixture of these acids and even aided, if fast foaming is desired, with a conventional acidic catalyst, such as hydrochloric. Normally the more viscous resoles yield the higher density foams of 20 to 60 pounds per cubic foot whereas lighter foams of 1 to 10 pounds per cubic foot are more desired.

The phenol-aldehyde condensation products employed in this invention are not narrowly critical and are well known in the art for making phenolic foams. They are commonly called one-step resins or "resoles," being the condensation reaction products of monohydric phenol and an aldehyde. Preferred are the resins of phenol per se and formaldhyde although other phenols such as meta cresol, meta xylenol and the like can as well be employed as can mixtures of phenol and ortho cresol. Similarly, the formaldehydes can be replaced by other aldehydes or aldehyde liberating compound such as paraformaldehyde, formalin and the like.

The liquid resole resins are the alkaline-catalyzed condensates which are carried to only a mild state of resinification so that they are normally liquid and generally water-soluble. This is often referred to as the "A" state of resinification, the "C" stage being the fully cured thermoset resin stage.

As the condensation between the phenol and aldehyde progresses from the liquid low molecular weight resins, the molecular weight of the condensation product increases and the resin exhibits a corresponding increase in viscosity. Since the addition of small amounts of the blowing agent may increase or decrease the viscosity of the liquid resins, the viscosity of the foamable composition is not narrowly critical, but is dependent to a degree on the amount of blowing agent present. Typical foamable resole compositions employable herein would include those which have an initial viscosity at 25° C. ranging from about 200 centipoises to about 300,000 centipoises, with those having a viscosity ranging from about 400 to about 25,000 centipoises being preferred for easiest handling.

Minor amounts of water can be tolerated in these resins although it is preferred that water content be kept to less than 10% by weight of resin.

Advantages are also made of mixtures of several different resole resins in order to control the initial viscosity and reactivity of the foamable compositions. For example, mixtures of high viscosity and a low viscosity resin have been used to control the ultimate density of foam, as hereinafter shown. Similarly, mixtures of liquid and solid resole can be employed to the same effect.

It is comtemplated in the invention that any resole resin either initially liquid or made fluid by the addition of any agent or by any technique can be employed in this invention.

As hereinbefore indicated, the foaming of the compositions can be induced by heat or reduction of pressure alone. However, heat is necessary in order to advance the foamed resin to a thermoset state. When the mixture of resole resin and a volatile organic blowing agent is employed, the exothermic curing reaction of the condensation reaction is catalyzed with this mixture of acids, the exotherm is of such a magnitude to not only volatilize all of the water of condensation and/or any water initially present but also all of the organic blowing agents even those having boiling points as high as 200° F. or more.

While these organic "foam assists" or foaming agents are not essential or critical in this invention, they are immeasurably beneficial in providing uniform and highly desirable results. The preferred foam assists have atmospheric boiling points from —40° F. to 200° F., and are normally aliphatic hydrocarbons, oxyhydrocarbons, or halohydrocarbons such as alkyl ethers, ketones, lower alkanes and halogenated alkanes as for example pentane, hexane, diethyl ether, diisopropyl ether, acetone, dichloromethane, dichloroethane and the like. Most of these agents provide an open-celled foam highly desirable for use where its liquid "wicking" properties are desirable as a source of moisture for making floral arrangements and the like.

A closed-cell phenolic foam is provided with polyhalogenated saturated fluorocarbons having more than one halogen atom bonded to aliphatic carbon atoms, in which at least one is fluorine, and which compound is free of aliphatic and aromatic unsaturated, and is illustrated by the following species shown in Table I.

TABLE I

| Foaming agent: | Atmospheric pressure boiling point, ° F. |
|---|---|
| Monochloro-difluoromethane | —41 |
| Dichloro-difluoromethane | —21.6 |
| 1,2-dichloro 1,1,2,2-tetrafluoroethane | 38.4 |
| 1,1,1-trichloro 2,2,2-trifluoroethane | 45.8 |
| 1,2-difluoroethane | 50 |
| Trichloro-monofluoromethane | 74.8 |
| 1,1,2-trichloro-1,2,2-trifluoroethane | 117.6 |
| 1,1,2,2-tetrachloro-2,2-difluoroethane | 196.7 |
| 1,1,1,2-tetrachloro-2,2-difluoroethane | 199 |

However, other blowing agents, be they such fluorocarbons or other agents, having a boiling point from about —40 to +200° F. can be used alone or in combination if desired. A plurality or mixture of any of such blowing agents can be employed, in which each is designed to volatilize at a different temperature so as to give volatilization at its respective different temperature throughout the exothermic curing reaction can be employed to provide "froth" foaming techniques, i.e. where one agent having a high volatilization rate at the ambient temperature and pressure first foams the resin composition and another which volatilizes at a higher temperature does additional foaming of the resin once the acid mixture initiates the condensation reaction exotherm.

The amount of the foaming assist is not narrowly critical. When it is employed, amounts of from 2 to 50 parts per 100 parts by weight of resin are most desirable, provided that the foamable composition is relatively viscous i.e. above about 200 cps. Some of these foaming agents have a rather severe dilution effect on the viscosity of the resole resin and cannot be used in the larger amounts. Methylene chloride for example can be employed in amounts only up to about 6 parts per hundred parts of resin whereas acetone can be employed in amounts up to about 15 parts and diisopropyl ether in amounts up to 20 parts per hundred parts of resin. Because of the unusual solubility phenomena of fluorocarbons, they can be employed in much greater amounts, even up to 50 parts of such agents per hundred parts of resin can be employed. Upon the addition of a fluorocarbon to the resole resin there is no appreciable decrease in viscosity, in fact, there is often an increase in viscosity which remains high during the initial stages of curing and aiding in the closed cell nature of the foam and the entrappment of the volatilized fluorocarbon.

However, the density of the foam is directly related to the amounts of the blowing agent employed and the rapidity with which the exotherm is developed by the acid mixture. The most useful foams commercially are those having densities from about 0.2 to 20 pounds per cubic foot which can be secured by a fast exotherm on a composition without any blowing agent but which can be more controllably developed when a blowing agent is present.

The blowing agents tend to act as nucleating agents for the foam development to provide for cells sites. Hence, a finer cell foam can be made using a blowing agent and particularly fine celled foam is secured with the fluorocarbons since they are soluble in the resole resin in much larger amounts than other agents and do not decrease the viscosity of the resin.

For most applications, it is preferred that the blowing agent be employed in amounts from about 2 to 20 parts per hundred parts of resin.

It has also been found that further advantages are secured in this system when a surface active agent also is employed as an additional control over the cell size in the foam. While it has been found that the cell size using the fluorocarbons is very fine, additional improvements in uniformity and size are secured by the use of a surface active agent. Particularly useful are the nonionic types such as the polyethers and polyalcohols, such as condensation products of alkylene oxides (such as ethylene oxides and propylene oxide) with alkyl phenols, fatty acids, alkyl silanes and silicones and like materials, as is exemplified by such products as octadecyl phenolethylene oxide, decyl phenol-ethylene oxide sulfate and the low polymers of such materials as polyoxyethylene dodecyl phenol, octyl phenol polyethylene glycol ether, ricinoleic acid polyethylene glycolate, stearic acid polyoxyethylene glycolates, and similar polyoxyethylated fatty acids and vegetable oils as well as polyoxyethylated fatty acid esters as polyoxyethylene sorbitan monolaurate, polyoxyethylene sorbitan tristerate, polyoxypropylene sorbitan monolaurate, and polyoxy(propylene-ethylene)sorbitan monolaurate, and polyoxyethylene sorbitan pentaoleate; polyoxyethylene sorbitan monopalmitate, the siloxane-oxyalkylene block copolymers such as those containing a Si—O—C linkage between the siloxane and oxyalkylene moieties and those containing a Si—C linkage between the siloxane and oxyalkylene moieties. Typical siloxane-oxyalkylene block copolymers contain a siloxane moiety composed of recurring dimethylsiloxy groups end-blocked with monomethylsiloxy and/or trimethylsiloxy groups and an oxyalkylene moiety composed of recurring oxyethylene and/or oxypropylene groups end-blocked with alkoxy groups. Similarly useful are the quaternary ammonium compounds with at least 2 alkyl groups attached to the nitrogen atom like cetyl dimethyl benzyl ammonium chloride, octadecyl dimethyl benzyl ammonium chloride, octadecanol-9-dimethyl ethyl ammonium bromide, and diisobutylphenoxyethoxy ethyl dimethyl benzyl ammonium chloride, and sorbitan fatty acid esters such as sorbitan monolaurate, sorbitan monopalmitate, sorbitan monstearate, sorbitan trioleate and like esters.

When present, these surface active agents can be employed in any desired amount depending on what results are desired. They serve to aid the nucleation for generation of smaller and more uniform cells. If the selected blowing agent also serves as a nucleation agent, very little or no surface active agent is needed. Best results seem to be secured in using amounts from 0.3 to about 5 percent by weight of the agent based on the weight of resole resin with preferred results at between about 0.5 to 3 percent by weight. Certain surfactants may cause collapse of the foam if employed in too great a concentration, and optimum concentration may vary with the individual surfactant selected.

It is to be understood that in the foamed resins of this invention, there may also be present other ingredients and agents to impart other desirable properties such as pigments, dyes, fillers, stabilizers, neutralizers, flame-proofers and solid nucleating agents and like additives without departing from this invention. In fact, certain beneficial properties result from many such additives. For example, fluorocarbon blown foams accept and tolerate a high filler loading because of the more efficient blowing agent. Since these foams are not corrosive to metal molds and other metal parts with the foams may contact, there is no need for latent neutralizers in the foams, though such can be added if desired. Also if desired, thermoplastic resins or modifiers such as polyvinyl alcohol, vinyl halide resins, and other similar thermoplastics can be used to improve toughness and other similar properties.

A highly desirable additive to these systems is a glycidyl ether of a polyhydric phenol, preferably one normally liquid or at least fusible at a temperature below the curing temperature of the phenolic resin in the form. These glycidyl ether epoxy resins are well known in the art, generally being prepared by the alkaline catalyzed reaction of epichlorohydrin or similar glycidyl ether precursor and a polyhydric phenol such as bisphenol A, 2,2-bis(4-hydroxyphenyl) propane or other similar dihydric phenol. They are also characterized by a structure such as:

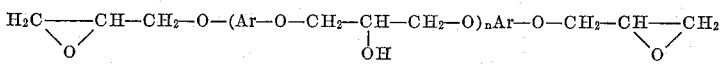

wherein Ar is the aromatic residuum of the dihydric phenol and $n$ is an integer from 0 to 3. The Ar residuum can be, for instance, the diphenylene propane residue of bisphenol A, the diphenylene sulfone of bisphenol S, the tetrachloro diphenylene propane of the tetrachlorobisphenol A and similar other residues of other dihydric phenols. Any of these can be employed in this invention, preferably in a minor amount compared to the phenolic resin component of the foamable composition, i.e. in amounts up to about 100 parts by weight per 100 parts of resole resin. Any amount can be employed however without departing from the intended scope of this invention, which provides the unusual features discovered herein. For example, an increase in the portion of epoxy resin used in the phenolic foam formulations improves foam resiliency and toughness, and increases the resistance to friability and improves rise efficiency and skin quality. Other advantages are secured in the closed cell content of the foams produced, greater water resistance, higher shear strengths and lower and more stable coefficients of thermal conductivity.

While the phenolic foams per se without the epoxy additive has good adhesion to most substrates in foam-in-place or foam-in-contact applications, these epoxy resin/phenolic resin blends have also been found to provide better adhesion to substrates in foam-in-place applications and also provides a substantially crack-free skin on free foaming. This latter feature is desirable in that a sound crack-free skin provides a good moisture vapor barrier. Cracks often also go into the foam and impair the physical strengths of the foam and may also cause loss of effective bonding strengths.

With or without the epoxy resin additives the foams may be foamed-in-place against a decorative skin of film of another resin, or even against wood or metal surfaces to give firmly adherent laminates for structures as fire doors, building panels and the like where the foam is more than just an insulator in that it also serves to strengthen and rigidify the structure.

For those systems containing a relatively high percentage of epoxy resin, it may be desirable to have present, in addition to the mixture of boric acid and hydroxy acid catalyst, a second catalyst for the curing of the epoxy resin. A preferred catalyst being boron trifluoride, particularly as a complex with phenol and stabilized with dipropylene glycol. However, if desired, any other conventional oxirane ring opening catalyst can be employed since the exotherm of the epoxy additive on curing is also sufficient to initiate the exotherm for the curing of the resole resin and the foaming of the blowing agent, if present.

In formulations containing only small amounts of liquid epoxy resin, the boric acid-hydroxy acid mixture alone is sufficiently effective to give good results.

With the large potential markets, such as building panel cores and industrial insulation, that exist today for rigid plastic foams, a phenolic/epoxy foam has merit over other foams in the area of cost, heat resistance, moldability, sprayability, dimensional stability, fire resistance, adhesion, and thermal insulation. Also such a system also has greater latitude in formulating for the properties needed in any given application.

A broad foam formulation for the phenolic/epoxy system is as follows:

| | Parts by weight |
|---|---|
| Blends of liquid resole resin | 75 |
| and | |
| Liquid epoxy resins (such as the diglycidyl ether of bisphenol A) | 25 |
| Surfactant | 0.5–5.0 |
| Fluorocarbon or blends of the two fluorocarbons | 2–30 |
| Catalyst: | |
| Boric acid | 2–10 |
| Oxalic acid | 10–40 |

It is also within the concept of this invention to add to the foamable composition of resole resin other resins and co-reactants such as for example, urethane monomers such as polyols and polyisocyanates. Tough and low friability foams also result. With such isocyanates as 2,4 or 2,6 toluene diisocyanate in combination with polyols such as glycerine in this system, a higher closed cell foamed system is secured with a base-catalyzed oven-cured composition. While considerable latitude exists on such urethane modification of these compositions a typical foamable formula could be secured as follows:

| | Parts |
|---|---|
| Resole resin | 100 |
| Surfactant | 2 |
| Fluorocarbon | 2–10 |
| Glycerine or other polyol | 12 |
| 2,4-toluene diisocyanate or other isocyanate | 6 |
| Boric acid | 15 |
| Oxalic acid | 15–30 |

Increasing the amount of glycerine to 20–30 parts results in a tougher, denser foam. Increasing the amount of the diisocyanate results in a lighter more friable foam.

It is, of course, to be understood that any other polyol or other diisocyanate known to produce urethane resins can also be employed in place of those mentioned above since these are not critical in the present invention.

In the following Table II, comparative evaluations are made between foams catalyzed with different agents. The amount of the agent is indicated in parts per hundred parts by weight of resin (phr.). Where indicated with an "X," in the first two columns the composition would either not foam or cure, i.e. the composition would not even harden, or it would not foam if it did cure or slowly harden. When indicated "Cure and Foam," the composition cured rapidly enough to volatilize the blowing agent and set the resin foam. "Punking" indicates whether or not there was continuance of combustion of the foam after the removal of the flame by the hereinbefore described method of testing. All foams were prepared in the same manner as described in the appended examples. The resole resin indicated in the table by its viscosity in centipoises (cps.) at 25° C. contained varying amounts of water from 0.8 to 8% by weight water depending on the viscosity. The higher viscosity resins containing the greater amounts of water. All other ingredients were maintained the same for comparison purposes. The blowing agent was 15 parts per hundred parts of resin (phr.) of 1,1,2-trichloro, 1,2,2,-trifluoroethane and there was also present about 3 phr. of surfactant, it being in this instance silicone L–530, an ethyleneoxide, propylene oxide silicone block copolymer having the empirical formula

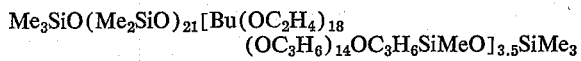

where Me is a methyl group and Bu is a butyl group.

are not intended to be limiting in any way of the invention described but will serve to illustrate certain preferred embodiments thereof. Unless otherwise mentioned, all parts and percentages hereinbefore and hereinafter used are by weight.

Examples

As shown in the following tables, a number of examples were prepared in accordance with this invention, these were conducted by admixing at room temperature 100 parts of a commercially available water-soluble liquid resole resins of phenol-formaldehyde having the indicated viscosity (in cps. at 25° C.) with the indicated amount of surfactant (silicone L–530, non-hydrolyzable surfactant used unless otherwise indicated) and foaming agent. These were rapidly agitated with a propeller stirrer for about 15 seconds. The catalyst was then added in the indicated amounts and the mixture again well stirred.

Foaming began in 30 to 90 seconds after initial mixing and was complete in 90 to 120 seconds with a noticeable exotherm indicating reaction and curing of the resin. The foam was allowed to cool and was examined. The

TABLE II

| Additives | Amount, phr. | Resin viscosity, cps. | I No foam, no cure | II Cure, no foam | III Cure, foam | IV Punking |
|---|---|---|---|---|---|---|
| $H_3BO_3$ | 27.0 | 600 | | | X | No. |
| Oxalic acid | 8.5 | | | | | |
| $H_3BO_3$ | 14.5 | 600 | | | X | No. |
| Oxalic acid | 21.0 | | | | | |
| $H_3BO_3$ | 5.7 | 600 | | | X | No. |
| Oxalic acid | 29.7 | | | | | |
| 37% HCl alone | 12 | 3,000 | X | | X | Yes. |
| $H_3BO_3$ | 20 | 600 | X | | | |
| Acid Mixture A [1] | 15 | 3,000 | | | X | Yes. |
| Acid Mixture B [2] | 15 | 3,000 | | | X | Yes. |
| $B_2O_3$ | 17.4 | 3,000 | | | X | No. |
| Oxalic acid | 22.6 | | | | | |
| $B_2O_3$ | 4 | 3,000 | | | X | No. |
| Oxalic acid | 35.0 | | | | | |
| $B_2O_3$ | 4 | 3,000 | | | X | Yes. |
| HCl | 10 | | | | | |
| Al stearate | 10 | {1  600[3] / 3  10,000} | | | | |
| +HCl | | | | | X | Yes. |
| $PCl_3$ | 5 | {1  600[3] / 3  10,000} | | | X | Yes. |
| $POCl_3$ | 2 | {1  600[3] / 3  10,000} | | | X | Yes. |
| $SnCl_4$ | 20 | {1  600[3] / 3  10,000} | | | X | Yes. |
| $SnCl_4$ | 10 | {1  600[3] / 3  10,000} | | | X | Yes. |
| $MgCl_2$ | 20 | {1  600[3] / 3  10,000} | X | | | |
| +HCl | 10 | | | | X | Yes. |
| $SbCl_3$ | 20 | 3,000 | | | X | Yes. |
| $ZnCl_2$ | 15 | 600 | X | | | |
| $FeCl_3$ (Anhy.) | 14 | {1  600[4] / 1  10,000} | | | X | Yes. |
| $FeCl_3 \cdot 6H_2O$ | 25 | 10,000 | | X | | |
| Sodium borohydride | 6 | 3,000 | X | | | |
| Phosphate rock | 15 | 3,000 | X | | | |
| +HCl | 12 | | | | X | Yes. |
| Gypsum plaster | 15 | 3,000 | X | | | |
| +HCl | 15 | | | | X | Yes. |
| Dechlorane [5] | 5 | 3,000 | X | | | |
| +$Sb_2O_3$ | 2.5 | | | | | |
| and HCl | 10 | | | | X | Yes. |
| Dechlorane [5] | 19 | 3,000 | X | | | |
| +$Sb_2O_3$ | 5 | | | | | |
| Tricresyl phosphate | 10 | | | | | |
| +HCl | 10 | | | | X | Yes. |
| Al powder | 2 | 3,000 | X | | | |
| +HCl | 12 | | | | X | Yes. |
| $Al_2(SO_4)_3 \cdot 18H_2O$ | 20 | 600 | X | | | |
| $Al_2O_3$ | 10 | 3,000 | X | | | |
| +HCl | 10 | | | | X | Yes. |

[1] Mixture of 50 parts 98% $H_2SO_4$, 7 parts $H_3PO_4$ and 50 parts $H_2O$.
[2] Mixture of 60 parts 98% $H_2SO_4$, 7 parts $H_3PO_4$ and 60 parts diisopropylether.
[3] Mixed resins in 1/3 wt. proportions.
[4] Mixed resins in 1/1 wt. proportions.
[5] Perchloropentacyclodecane.

The invention is further illustrated by the following examples which are illustrative only of certain aspects of the invention hereinbefore described in detail. They surface of most samples had a high degree of gloss with few surface imperfections. There were few fractures or cavities on the outside or inside of the foam, and the inside was fine uniform closed cells with no large air pockets or blowholes. Sections of the foam were taken, and core densities were measured on sized samples by weighing. The foam core had a density as indicated in the tables and samples were tested for punking retardancy by the hereinbefore described test. Time for the surface of the foam to reach 500° F. is also noted in the tables. Compressive strength was measured for some examples.

Resin A is a sodium hydroxide catalyzed phenol-formaldehyde resole resin having a viscosity of about 600–1000 cps. at 25° C. and about 0.8 percent water. Resin B is a similar resole having a viscosity of about 3000 cps. and a water content about 7.0%. Resin C is a resole of a viscosity about 10,000 cps. and a water content about 8%. The compressive strength of those samples indicated was determined by ASTM Test D–1621–59T.

about 7%, and the epoxy resin was the diglycidyl ether of bisphenol A, having an epoxy equivalency of 190 and a viscosity of about 7,000–9,000 cps. Properties of the foam were measured as before.

TABLE V

|  | a | b | c | d |
|---|---|---|---|---|
| Epoxy resin | 50 | 25 | 75 | 10 |
| Resole resin | 50 | 75 | 25 | 90 |
| Foam | Yes | Yes | Yes | Yes |
| Density (#/ft.$^3$) | 2.2 | 2.1 | 1.6 | 3.3 |
| Punking | No | No | No | No |
| Min. to reach 500° F | 13.0 | 9.2 | [1] 6.0 | 38 |

[1] Sample smoked on heating but did not punk.

What is claimed is:
1. A method for producing non-burning, non-punking

TABLE III

| Examples | 1 | 2 | 3 | 4 | 5 | 6 | 7 | 8 | 9 | 10 | 11 | 12 | 13 |
|---|---|---|---|---|---|---|---|---|---|---|---|---|---|
| Resin A |  |  |  | 25 | 25 | 50 | 50 | 50 |  |  | 50 | 50 | 50 |
| Resin B | 100 | 100 | 100 |  |  |  |  |  | 100 | 100 |  |  |  |
| Resin C |  |  |  | 75 | 75 |  |  |  |  |  |  |  |  |
| Catalyst: |  |  |  |  |  |  |  |  |  |  |  |  |  |
| $B_2O_3$ | 17.4 | 4.0 | 4.0 |  |  | 13.45 | 7.25 | 2.86 |  |  | 1.61 | 4.36 | 7.56 |
| $H_3BO_3$ |  |  |  | 20 |  |  |  |  |  |  |  |  |  |
| Oxalic acid | 22.6 |  | [1] 35.0 |  |  | 4.3 | 10.5 | 14.89 |  |  | 8.39 | 5.54 | 2.44 |
| HCl |  | 10 |  |  |  |  |  |  | 12 |  |  |  |  |
| $BF_3$-phenol[2] |  |  |  |  | 15 |  |  |  |  | 15 |  |  |  |
| Surfactant–L–530 | 3 | 3 | 3 | 3 | 3 | 1.5 | 1.5 | 1.5 | 1.0 | 1.0 | 1.5 | 1.5 | 1.5 |
| Blowing Agent, UCON 113[3] | 10 | 10 | 10 | 15 | 5 | 5 | 5 | 5 | 15 | 15 | 5 | 5 | 5 |
| Foam | Yes | Yes | Yes | No | Yes | Yes | Yes | Yes | [4] Yes | [4] Yes | Yes | Yes | Yes |
| Density #/ft.$^3$ | 2.6 | 3.49 | 5.25 |  | 3.52 | 2.32 | 0.89 | 0.84 | 2.27 | 2.33 | 0.78 | 0.56 | 0.46 |
| Min. to reach 500° F | 11.25 | 2.0 | 52 |  | 1.25 | 16.5 | 1.9 | 2.2 | 2.0 | 1.4 | 3.6 | 2.7 | 2.4 |
| Punking | No | Yes | No |  | Yes | No | No | No | Yes | Yes | No | No | No |
| Compressive strength (p.s.i.) | 10.8 | 48.0 | 68.6 |  | 29.3 | 1.4 | 1.3 | 1.2 | 30.7 | 19.5 | 0.66 | 0.56 | 0.46 |

[1] Added after other ingredients (except for oxalic acid) had been mixed and stood for 4 hours.
[2] 10 parts $BF_3$-phenol complex stabilized with 5 parts dipropylene glycol.
[3] 1,1,2-trichloro, 1,2,2-trifluoroethane.
[4] Severe skin cracking on cooling.

TABLE IV

| Examples | 14 | 15 | 16 | 17 | 18 | 19 | 20 | 21 | 22 | 23 | 24 |
|---|---|---|---|---|---|---|---|---|---|---|---|
| Resin A | 50 |  | 50 | 50 | 50 | 50 |  |  |  |  |  |
| Resin B |  | 100 |  |  |  |  | [1] 100 | [1] 100 | [1] 100 | [1] 100 | 100 |
| Resin C | 50 |  |  |  |  |  |  |  |  |  |  |
| Catalysts: |  |  |  |  |  |  |  |  |  |  |  |
| $B_2O_3$ | 17.0 | 17.4 | 4.0 | 3.36 | 3.18 | 2.66 | 1.64 | 2.76 | 1.38 | 1.38 | 4.0 |
| Oxalic acid | 23.0 | 22.6 |  |  |  |  | 38.4 | 37.24 | 18.62 | 18.62 |  |
| Malonic acid |  |  | 6.0 |  |  |  |  |  |  |  |  |
| Salicylic acid |  |  |  | 6.64 |  |  |  |  |  |  |  |
| Tartaric acid |  |  |  |  | 6.86 |  |  |  |  |  |  |
| Citric acid |  |  |  |  |  | 7.34 |  |  |  |  |  |
| 37% HCl |  |  |  |  |  |  |  |  |  | 2.0 | 10 |
| Surfactant—L–530 | 3 | 3 | 1.5 | 1.5 | 1.5 | 1.5 | 3 | 3 | 3 | 3 |  |
| Blowing Agent: |  |  |  |  |  |  |  |  |  |  |  |
| Ucon 113, methylene chloride | 15 | 10 | 5 | 5 | 5 | 5 | 10 | 10 | 10 | 10 | 10 |
| Water |  |  |  |  |  |  | 4 | 4 | 4 | 4 |  |
| Foam | Yes | Yes | Yes | Yes | Yes | Yes | Yes | Yes | Yes | Yes | Yes |
| Density #/ft.$^3$ | 2.23 | 3.2 | 1.66 | [2] 1–4 | [2] 1–4 | [2] 1–4 | 4.35 | 5.1 | 2.74 | 2.39 | 3.49 |
| Min. to reach 500° F | 27.4 | 50.0 | 22.0 | 1.5 | 4.20 | 32.0 | 14.5 | 17.5 | 23.5 | 2.5 | 2.0 |
| Punking | No | No | No | No | No | No | No | No | No | No | Yes |
| Compressive strength p.s.i. | 4.8 | 19.3 | 2.7 |  |  |  |  |  |  |  |  |

[1] Dehydrated resin-2.7% water.
[2] Estimated density.

*Example 25*

Foams were prepared using mixtures of epoxy resins and resole resins as shown in following Table V using a representative formulation as follows:

| | Parts |
|---|---|
| Total resins | 100 |
| Surfactant (L–530) | 3 |
| Blowing agent (1,1,2-trichloro 1,2,2-trifluoroethane) | 10 |
| Boric anhydride | 17.4 |
| Oxalic acid | 22.6 |

As indicated, the parts of epoxy resin and resole resin were mixed well with all ingredients before the boric anhydride and oxalic acid were added. Foaming started shortly after the acids were mixed in. The resole resin had a viscosity of about 3,000 cps. and water content of phenolic foams comprising admixing an organic foaming agent with a liquid phenol-aldehyde resole having a viscosity from 200 to 300,000 centipoises at 25° C. and at least two acidic agents, one of which is boric acid, and another of which is an organic hydroxy acid in which the hydroxyl group is on a carbon atom no more than one carbon atom removed from a carboxyl group in amounts of at least 2 parts by weight of each acid per hundred parts by weight of said resole and sufficient to initiate the foaming of the resulting mixture and curing the resole to produce a stable cured foam.

2. The method of claim 1 wherein boric acid is added as the anhydride.

3. The method of claim 1 wherein the organic hydroxy acid is oxalic acid.

4. A method for producing non-burning, non-punking phenolic foams comprising admixing an organic foaming agent with a liquid phenol-formaldehyde resole having a viscosity from 400 to 25,000 centipoises at 25° C., an organic foaming agent having an atmospheric boiling point from about −40° F. to 200° F., and at least two acidic agents one of which is boric acid, and another of which is an organic hydroxy acid in which the hydroxyl group is on a carbon atom no more than one carbon atom removed from a carboxyl group in amount of at least 2 parts by weight of each acid per hundred parts by weight of said resole and sufficient to initiate the curing exotherm of the resole thereby vaporizing the said foaming agent and curing the resole.

5. The method of claim 4 wherein the boric acid is added as the anhydride.

6. The method of claim 4 wherein there is present in the admixture from 0.3 to 5 parts by weight of a surface active agent per hundred parts of the said resole.

7. The method of claim 4 wherein the foaming agent is present in an amount from 2 to 50 parts by weight per hundred parts of the said resole, said amount being less than that sufficient to reduce the viscosity of the admixture to below 200 centipoises.

8. The method of claim 4 wherein the organic hydroxy acid is oxalic acid.

9. The method of claim 8 wherein oxalic acid and boric acids are in a solid fused admixture.

10. The method of claim 4 wherein there is present from 10 to 40 parts by weight of the total of boric and oxalic acids per hundred parts of said resole.

11. A foamable composition of matter comprising
 (a) a liquid phenol-aldehyde resole having a viscosity from 200 to 300,000 centipoises at 25° C.,
 (b) at least 2 parts by weight per hundred parts of said resole of boric acid,
 (c) at least 2 parts by weight per hundred parts of said resole of an organic hydroxy acid in which the hydroxyl group is on a carbon atom no more than one carbon atom removed from a carboxyl group, and
 (d) an amount of an organic liquid foaming agent sufficient to foam the composition.

12. The composition of claim 11 in which the organic hydroxy acid is oxalic acid.

13. The composition of claim 11 in which the boric acid is in the form of the anhydride.

14. The non-punking foamed and cured composition of claim 11.

15. A foamable composition of matter comprising
 (a) a liquid phenol-formaldehyde resole having a viscosity from 400 to 25,000 centipoises at 25° C.,
 (b) from 2 to 50 parts by weight of an organic foaming agent having an atmospheric boiling point from about −40° F. to 200° F. per hundred parts of said resole, the amount being less than that sufficient to reduce the viscosity of the composition to below 200 centipoises,
 (c) from 0.3 to 5 parts by weight of a surface active agent per hundred parts of said resole,
 (d) at least 2 parts by weight of boric acid per hundred parts of said resole,
 (e) at least 2 parts by weight per hundred parts of said resole of an organic hydroxy acid in which the hydroxyl group is on a carbon atom no more than one carbon atom removed from a carboxyl group, and
 (f) from 0 to 100 parts by weight of a liquid glycidyl ether of a polyhydric phenol per hundred parts of said resole.

16. The non-punking foamed and cured composition of claim 15.

17. The composition of claim 15 in which the organic hydroxy acid is oxalic acid.

18. The composition of claim 17 in which the total amount of oxalic acid and boric acid is from 10 to 40 parts per hundred parts of said resole.

19. The non-punking foamed and cured composition of claim 18.

20. The foamable composition of matter comprising
 (a) a liquid phenol-aldehyde resole having a viscosity from 400 to 25,000 centipoises at 25° C.,
 (b) from 2 to 50 parts by weight of an organic foaming agent having an atmospheric boiling point from about −40° F. to 200° F., per hundred parts of said resole, the amount being less than that sufficient to reduce the viscosity of the composition to below 200 centipoises,
 (c) from 0.3 to 5 parts by weight of a surface active agent per hundred parts of said resole,
 (d) at least 2 parts by weight of boric acid per hundred parts of said resole,
 (e) at least 2 parts by weight of oxalic acid per hundred parts of said resole,
 (f) from 10 to 30 parts by weight of a liquid polyol per hundred parts,
 (g) 5 to 10 parts by weight of said resole, and of a diisocyanate per hundred parts of said resole.

References Cited by the Examiner

UNITED STATES PATENTS

| | | | |
|---|---|---|---|
| 2,523,626 | 9/1950 | Jones | 260—2.5 |
| 2,611,694 | 9/1952 | Becher | 260—2.5 |
| 2,650,206 | 8/1953 | Stock | 260—2.5 |
| 2,681,326 | 6/1954 | Christianson | 260—2.5 |
| 2,845,396 | 7/1958 | Krebs et al. | 260—2.5 |
| 2,881,088 | 4/1959 | Schullenberg | 260—2.5 |
| 2,933,461 | 4/1960 | Mullen | 260—2.5 |

MURRAY TILLMAN, *Primary Examiner.*

N. F. OBLON, *Assistant Examiner.*